US012663351B2

(12) United States Patent
Sun et al.

(10) Patent No.: US 12,663,351 B2
(45) Date of Patent: Jun. 23, 2026

(54) EXPERIMENTAL DEVICE AND METHOD FOR MEASURING MOTION PROBABILITY OF NONUNIFORM SEDIMENT

(71) Applicant: Zhejiang University, Hangzhou City (CN)

(72) Inventors: Zhilin Sun, Hangzhou (CN); Yizhi Sun, Hangzhou City (CN); Lixia Sun, Hangzhou City (CN); Lili Zhu, Hangzhou City (CN)

(73) Assignee: Zhejiang University, Hangzhou City (CN)

( * ) Notice: Subject to any disclaimer, the term of this patent is extended or adjusted under 35 U.S.C. 154(b) by 431 days.

(21) Appl. No.: 18/501,695

(22) Filed: Nov. 3, 2023

(65) Prior Publication Data

US 2024/0159639 A1 May 16, 2024

(30) Foreign Application Priority Data

Nov. 7, 2022 (CN) .......................... 202211385856.6

(51) Int. Cl.
*G01N 15/04* (2006.01)
*G01N 15/00* (2024.01)

(52) U.S. Cl.
CPC ..... *G01N 15/04* (2013.01); *G01N 2015/0053* (2013.01)

(58) Field of Classification Search
CPC ....................... G01N 15/04; G01N 2015/0053
See application file for complete search history.

(56) References Cited

U.S. PATENT DOCUMENTS

| | | | | | |
|---|---|---|---|---|---|
| 9,856,723 | B2 * | 1/2018 | An | ............................ | E02D 1/02 |
| 10,067,091 | B2 * | 9/2018 | Hassell, Jr. | ........ | G01N 33/2847 |
| 10,684,208 | B2 * | 6/2020 | Liu | .................... | G01N 21/8507 |
| 11,821,885 | B2 * | 11/2023 | Dong | .................... | G01N 33/18 |

* cited by examiner

*Primary Examiner* — An H Do
(74) *Attorney, Agent, or Firm* — Brennan, Manna & Diamond, LLC; Matthew J. Schonauer

(57) ABSTRACT

An experimental device and method for measuring a motion probability of nonuniform sediment are provided. The method includes: dyeing sediment of different particle sizes to obtain nonuniform dyed sediment, sticking sediment with the same grades to the bottom of a flume to form a rough plate; soaking the nonuniform dyed sediment, laying the nonuniform dyed sediment on the sediment feeder, transporting the sediment by water with given intensity, and once the flow is stable, starting the sediment feeder to perform a test until the sediment stops moving. Collecting, drying and sieving the sediment in the bedload collector and the suspended load collector, and weighing the dyed sediment of different particle sizes. Computing the incipient probability and the suspension probability respectively by measuring the weight ratios of the sediment of different grades from the two collectors to the initial ones.

14 Claims, 2 Drawing Sheets

EXPERIMENTAL DEVICE AND METHOD FOR MEASURING MOTION PROBABILITY OF NONUNIFORM SEDIMENT

CROSS REFERENCE TO RELATED APPLICATION

This patent application claims the benefit and priority of Chinese Patent Application No. 202211385856.6 filed with the China National Intellectual Property Administration on Nov. 7, 2022, the disclosure of which is incorporated by reference herein in its entirety as part of the present application.

TECHNICAL FIELD

The present disclosure relates to the field of river sediment dynamics, and in particular, to an experimental device and method for measuring a motion probability of nonuniform sediment.

BACKGROUND

Under certain flow and boundary conditions, part of the sediment in rivers and coastal waters is in a stationary state, while the other part is in a moving state, and the moving sediment falls into a bedload and a suspended load. A change of sediment from the stationary state to bedload involves the incipient motion of sediment, while a change from bedload to suspended load involves sediment suspension, and the critical state that sediment changes from bedload to suspended load is critical suspension. When an external force that causes sediment to move is greater than an external force that keeps sediment still, sediment will be in a motion state, which is a deterministic mechanical phenomenon. However, the external force caused by flow fluctuation is random, and the position of sediment on a bed surface is also random, so sediment motion is a random mechanical phenomenon. There has been great development in both experiments and theory about incipient motion and suspension of uniform sediment, and many formulas such as incipient velocity formulas, incipient shear stress formulas and suspension velocity formulas have been established, and some experimental studies have also been done on the incipient motion of nonuniform sediment. The above researches consider deterministic factors of sediment motion when sediment is either in a critical flow state of incipient motion or suspension, but have overlooked the randomness of sediment motion. Regarding randomness of sediment motion, many researchers have established theoretical expressions of the incipient probability and suspension probability, but experimental support is lacking. The main reason is that there is a lack of experimental methods for measuring the incipient probability and suspension probability, and there is so far no experimental method combining the incipient probability and suspension probability. For nonuniform sediment, the interaction between particles of different sizes makes the motion of nonuniform sediment much more complicated than that of uniform sediment. Research on motion of nonuniform sediment is far less in-depth than that of uniform sediment, and about the uncertainty of nonuniform sediment the research on the incipient probability and suspension probability is even less, which is mainly limited to theoretical derivation of the probability distribution and experimental verification of the probability distribution, especially the latter is still in a blank state. In summary, with regard to the incipient probability and suspension probability problems of nonuniform sediment, it is difficult to distinguish the motion states of particles of different sizes in the experiment, and the problem of collecting fractional sediment under different motion states has not been solved for a long time, which delays the experimental research on the motion probability of nonuniform sediment.

The motion probability of sediment reflects the possibility of mass exchange of sediment on a bed surface and in water flow, can quantitatively describe the mass of sediment exchange in different motion states, and is an important parameter of sediment transport equation as well as boundary conditions in a mathematical model. In addition, the motion probability of sediment can be used to calculate the sediment transport capacity of flow and the equilibrium bedload transport rate, so as to predict geomorphological evolution of waters such as rivers, estuaries, coasts, bays, reservoirs and lakes, and provide a scientific basis and theoretical support for practical issues such as port channel regulation, tidal flat scouring and silting, downstream scouring and silting of a reservoir, sediment deposition in a reservoir region, flood control and tide resistance. However, due to the lack of a device and method for measuring the motion probability of sediment, such as the incipient probability and suspension probability, theoretical study on randomness of sediment motion lacks verification by measured data. Until now these problems that should be solved by calculating the motion probability of sediment can only be handled by using deterministic critical parameters such as an incipient velocity, an incipient shear stress and a stirring-up velocity.

SUMMARY

In view of the shortcomings of the prior art, the present disclosure provides a device and method for measuring a motion probability of nonuniform sediment, to guide calculation of an incipient probability and a suspension probability of nonuniform sediment and make up for the blank of the motion probability experiment of nonuniform sediment in river sediment dynamics.

The objectives of the present disclosure are achieved by the following technical solutions.

An experimental device for measuring a motion probability of nonuniform sediment, comprising a flume, a sediment feeder, a bottom bed-simulated plate, a bedload collector, and a suspended load collector, wherein the flume comprises a water storage tank, a submersible pump, a flow-stabilizing plate, a front door, a flume body, a tail door and a water return pipe; the flume body is located above the water storage tank, and a tail of flume body is connected to the water storage tank through the return pipe; the submersible pump is located in the water storage tank, a water outlet of the submersible pump is connected to a water inlet of flume body through a pipeline so as to pump water into the flume body; the flow-stabilizing plate is installed near the water inlet of the flume body in order to enable the water to flow stably into the flume body; the front door and the tail door are located at both ends of the flume body respectively, which are able to be drawn up and down so as to block the water or adjust discharge in the flume body; wherein the sediment feeder, located at a bottom of the flume body, is configured to contain sediments; the sediment feeder has a cover plate which is capable of bouncing off automatically; wherein the bottom bed-simulated plate, the bedload collector and the suspended load collector are sequentially arranged at the bottom of the flume body along a flow direction of the water; the bottom bed-simulated plate is located between the sediment feeder and the bedload collector; the bottom of the flume body has two holes, each of the bedload collector and the suspended load collector comprises a straight pipe and a bent pipe, and is fixed to one of the holes, at a corresponding position, at the bottom of the flume body through the straight pipe, and the bedload collector and the suspended load collector are configured to collect a bedload and a suspended load respectively.

Furthermore, the sediment feeder is a drawer-type box with a rectangular cross-section and a trapezoidal profile, and comprises a movable cover plate; and each of two side surfaces of the cover plate is connected to a bayonet control switch via a spring.

Furthermore, a width of the bedload collector is equal to a width of the flume body, and a rotating blade is arranged at a joint of the straight pipe and bent pipe of the bedload collector to stop the water flowing from the flume body; and a detachable circular sealing plate is fixed to a tail of the bent pipe so as to facilitate sediment collection.

Furthermore, the suspended load collector and the bedload collector have a same structure, and a size of the suspended load collector is greater than that of the bedload collector along the flow direction of the water.

Furthermore, the flow-stabilizing plate comprises two flow-stabilizing plates, which are set apart in parallel near the water inlet of the flume body.

Furthermore, the flow-stabilizing plate is made of organic glass with uniform holes.

Furthermore, a size $L_{push}$ of the bedload collector along the flow direction of the water is slightly greater than a maximum length $L_b$ of bedload jump:

$$L_{push} > L_b = \alpha D_{max} \left( \frac{\rho_s - \rho}{\rho} \right)^{1/3} \tau_*^{0.11} \left( \sqrt{\tau_*} - \beta \sqrt{\tau_{*c}} \right) \text{ and }$$

$$\beta = \frac{\left( D_m / D_{max} \right)^{1/4}}{1 + 0.13 \ln\left( D_m / D_{max} \right)} - 0.65$$

wherein $D_{max}$ is a maximum incipient particle size of experimental sediment; $p_s$ is a sediment density, and $\rho$ is a water density;

$$\tau_* = \frac{\rho}{\rho_s - \rho} \frac{R_b J}{D_{min}}$$

is a dimensionless flow shear stress, $D_{min}$ is a minimum incipient particle size of the experimental sediment, $R_b$ is a hydraulic radius, and J is a hydraulic energy slope; $T_{*c}$ is a dimensionless incipient shear stress, takes value between 0.032-0.047; $D_m$ is an average particle size; a coefficient $\alpha$ is determined according to jumping experiments, and $\alpha \geq 150$; and a size $L_{sus}$ of the suspended load collector in the flow direction of the water is as follows:

$$L_{sus} > L_s = 1.2 \frac{V_0 h_0^2}{h \omega_{min}}$$

wherein $L_s$ is a maximum moving distance of the suspended load, $V_0$ is a flow velocity, $h_0$ is a water depth, h is a depth of the suspended load collector, and co mm is a settling velocity corresponding to a minimum particle size $D_{min}$ in experiments.

An experimental method for measuring a motion probability of nonuniform sediment, wherein the method is implemented based on the experimental device for measuring the motion probability of nonuniform sediment according to claim 1, and the method comprises: by a sieve, sieving natural sand to obtain particles of different sizes $D_k$, dyeing and drying the particles in colors of red, yellow, green, blue, purple, black and white to obtain dyed sediments, then weighing the dyed sediments to obtain a total weight $G_0$ of nonuniform sediment and a fractional weight $G_{0k}$ in each particle size, and calculating initial grades $p_{0k} = G_{0k} / \Sigma_k G_{0k}$; mixing and soaking the dyed sediment, and placing the dyed sediments into the sediment feeder as experimental sediments; sticking nonuniform sediment with a same initial grade as the experimental sediments on the bottom bed-simulated plate to form a rough bed; determining experimental water depths, setting a plurality of experimental flow velocities at each water depth to perform experiments, and for each group of experiments, obtaining fractional incipient probabilities, fractional suspension probabilities and corresponding probability distributions under a given flow condition; and ensuring that a minimum experimental flow velocity is greater than or equal to a calculated incipient velocity, and a maximum flow velocity is greater than or equal to a calculated suspension velocity; and calculating an incipient velocity $V_{kc}$ and a suspension velocity $U_{*s}$ for a kth particle size respectively through following formulas:

$$V_{kc} = 8 / 7 \left( h / D_m \right)^{1/6} \left[ \left( \rho_s / \rho - 1 \right) g D_k / \varepsilon_k \right]^{0.5}$$

$$U_{*s} = \begin{cases} \dfrac{4\omega}{D_*} & 1 < D_* \leq 10 \\ 0.4\omega & D_* > 10 \end{cases}$$

$$D_* = D_k \left( \frac{\rho_s - \rho}{\rho} \frac{g}{v^2} \right)^{1/3}$$

wherein $D_k$ is the $k^{th}$ particle size, g is a gravity acceleration, $\rho_s$ and $\rho$ are densities of sediment and water respectively, $$\varepsilon_k = \left( D_k / D_m \right)^{1/2} \sigma_g^{1/4}$$

is a interaction coefficient between different particles of nonuniform sediment, $D_m$ is an average particle size, $\sigma_g$ is a geometric standard deviation, and h is a water depth; $D_*$ is a dimensionless particle size, and $\omega$ is a settling velocity; starting the submersible pump, adjusting the front door and the tail door of the flume body to enable the water depth to reach a preset experimental value, and setting an appropriate flow velocity with reference to formula-calculated values of the incipient velocity and the suspension velocity to start the experiment; keeping the experimental flow velocity and the water depth unchanged, starting the sediment feeder, and starting an experiment transport of the dyed sediments in the flume body; keeping moving for a sufficiently long time so that the dyed sediments in the sediment feeder cease to move and the dyed sediments on the rough plate is washed out, and closing the tail door and the submersible pump to stop the experiment; and collecting, in a case of partial transport, the dyed sediment in the sediment feeder, the bedload collector and the suspended load collector respectively, drying and then sieving the dyed sediments via the sieve, weighing the dyed sediments with different particle sizes in the bedload and the suspended load respectively to obtain weights $G_{bk}$ and $G_{sk}$ and calculating a fractional incipient probability $p_{bk}=G_{bk}/G_0$ and a fractional suspension probability $p_{sk}=G_{sk}/G_0$ of the nonuniform sediment, so as to obtain a cumulative frequency of the bedload, namely an incipient probability distribution $$P_{bk} = \sum\nolimits_{i=1}^{k} p_{bi},$$

and a cumulative frequency of the suspended load, namely a suspension probability distribution $$P_{sk} = \sum\nolimits_{i=1}^{k} p_{si};$$

or collecting, in a case of full transport, the dyed sediments in the bedload collector and the suspended load collector respectively, calculating an incipient probability and a suspension probability in a same way as in the case of partial transport, and obtaining respective probability distributions.

The present disclosure has the following beneficial effects:

(1) The disclosed device is designed for measuring the motion probability of nonuniform sediment, concerning the absence of a motion probability experiment of nonuniform sediment in river sediment dynamics.

(2) The method for measuring the motion probability of nonuniform sediment according to the present disclosure overcomes the difficulty of measuring the incipient probability and suspension probability of nonuniform sediment synchronously, while previous research on incipient and suspension of nonuniform sediment focuses merely on the critical incipient or the critical suspension, which does not involve the probability experiment, and cannot achieve a synchronous measurement of incipient and suspension.

(3) By using the method according to the present disclosure, the motion probability of sediment particles of different sizes can be obtained under the same experimental condition, so that not only motions between different particles can be compared, but also the incipient probability and suspension probability can be compared.

(4) Based on the device and method for measuring the motion probability of nonuniform sediment according to the present disclosure, the incipient probability and suspension probability of sediment particles of multiple sizes under a given flow condition can be obtained in one experiment, thereby greatly improving experimental efficiency, significantly reducing experimental costs and time cost, and achieving high accuracy of data acquisition and good synchronization or comparability.

6

Figure 1:
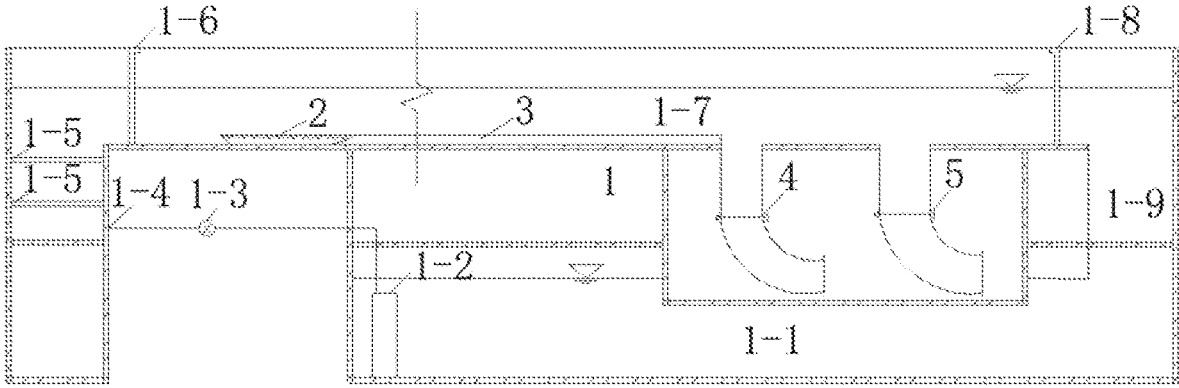
FIG. 1 is a schematic diagram of an experimental device for measuring a motion probability of nonuniform sediment.

In the figures: flume 1, water storage tank 1-1, submersible pump 1-2, electromagnetic flowmeter 1-3, water inlet 1-4, flow-stabilizing plate 1-5, front door 1-6, flume body 1-7, tail door 1-8, return pipe 1-9, sediment feeder 2, hole 2-1, spring 2-2, cover plate 2-3, bayonet control switch 2-4, bottom bed-simulated plate 3, bedload collector 4, rotating blade 4-1, circular sealing plate 4-2, suspended load collector 5, rotating blade 5-1, circular sealing plate 5-2.

DETAILED DESCRIPTION OF THE EMBODIMENTS

The present disclosure is described in detail with reference to accompanying drawings and preferred embodiments, to make the objective and effect of the present disclosure clearer. It should be understood that the specific embodiments described herein are merely intended to illustrate the present disclosure and are not intended to limit the present disclosure.

Figure 2:
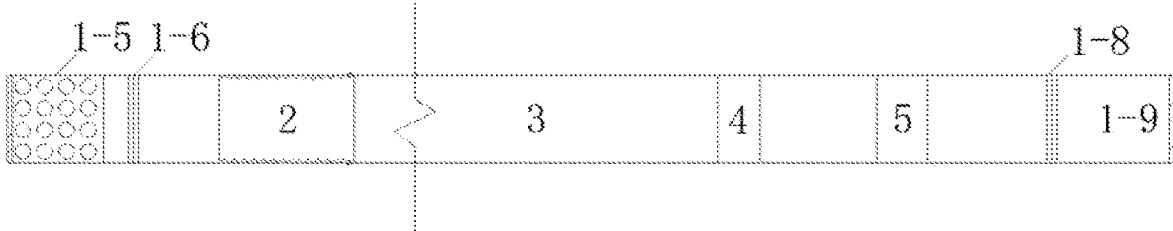
FIG. 2 is a top view of the experimental device for measuring the motion probability of nonuniform sediment.
Figure 3:
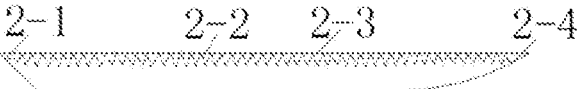
FIG. 3 is a sectional view of a sediment feeder.
Figure 4:
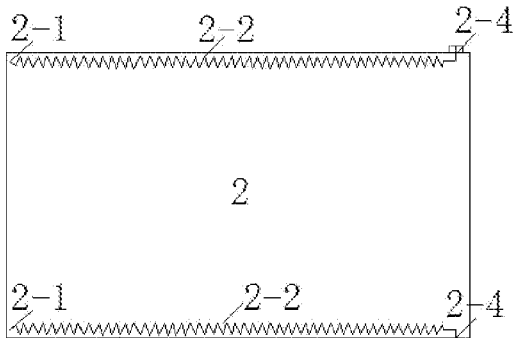
FIG. 4 is a top view of the sediment feeder.

As shown in FIGS. 1 and 2, an experimental device for measuring a motion probability of nonuniform sediment according to the present disclosure includes a flume 1, a sediment feeder 2, a bottom bed-simulated plate 3, a bedload collector 4, and a suspended load collector 5.

The flume 1 includes a water storage tank 1-1, a submersible pump 1-2, an electromagnetic flowmeter 1-3, flow-stabilizing plates 1-5, a front door 1-6, a flume body 1-7, a tail door 1-8, and a return pipe 1-9. The flume body 1-7 is located on an upper portion of the water storage tank 1-1, and the tail of the flume body 1-7 communicates the water storage tank 1-1 through the return pipe 1-9. The submersible pump 1-2 is located in the water storage tank 1-1, and the water outlet of the submersible pump 1-2 communicates with the water inlet 1-4 of the flume body 1-7 through a pipeline, so that water in the water storage tank 1-1 is pumped into the flume body 1-7 through a pipeline. The flow-stabilizing plate 1-5 is made of organic glass with uniform holes, is arranged near the water inlet 1-4 of the flume body 1-7, and is configured to enable the water to smoothly flow into the flume body 1-7. As shown in FIG. 1, two flow-stabilizing plates 1-5 are provided, and are arranged spaced apart in parallel. The front door 1-6 and tail door 1-8 are located at the front and tail end of the flume body 1-7, respectively. The front door 1-6 and tail door 1-8 are organic glass baffles that can be drawn up and down, and may be configured to block water flow or adjust discharge of the flume body. When the bottom of the front door 1-6 and the bottom of the tail door 1-8 are in contact with a tank bottom simultaneously, the flume body is closed, so that water can be injected into the flume before an experiment starts. After the experiment begins, the front door 1-6 is completely opened, and water in the flume body can be controlled by twitching the tail door 1-8 up and down, so as to control the water depth and adjust the discharge to the water depth required for the experiment.

As shown in FIGS. 1-4, the sediment feeder 2 is a drawer-type box with a rectangular cross-section and trapezoidal profiles. The sediment feeder 2 is located at the bottom of the flume body 1-7, and has a top length L greater than the bottom length $L_b$, a width B the same as the width of the flume, and a height of $\delta$. The sediment feeder 2 includes a box and a cover plate 2-3. A spring 2-2 and a bayonet control switch 2-4 are arranged on the front side of the cover plate 2-3. One end of the spring 2-2 passes through a hole 2-1 of the cover plate 2-3 to be connected to the box below, and the other end thereof passes through the cover plate 2-3 to be connected to the bayonet control switch 2-4 fixed to the flume body 1-7. Before the experiment begins, the bayonet control switch 2-4 is turned off, the cover plate 2-3 is clamped, the spring 2-2 is in a tensile state, and experimental sediment is blocked by the cover plate 2-3. When the water flow is adjusted to a predetermined uniform flow state, the bayonet control switch 2-4 is turned on, and the spring 2-2 drives the cover plate 2-3 to open in a direction opposite to a flow direction of the water, so that the experiment sediment is exposed to the water flow to start to move.

Further, the slope of the water inlet of the sediment feeder 2 is the same as an initial angle of formation of a water vortex cluster, so as to prevent formation of a spiral vortex cluster, ensure that the water flows into the sediment feeder 2 in a streamlined manner, and prevent the generation of the vortex from affecting sediment motion. The tail end of the water outlet is tangent to the flow and streamlined, so that the water flows smoothly.

The bedload collector 4 and suspended load collector 5 are sequentially arranged in a flow-stabilizing region of the middle-rear portion of the flume body 1-7, and two through holes are formed in the middle-rear portion of the bottom of the flume body 1-7, and are configured to mount the bedload collector 4 and suspended load collector 5 respectively. The bedload collector 4 and suspended load collector 5 have the same structure and each have a width the same as the flume width of the flume body 1-7 and each are a cubic cylinder, includes a straight pipe and a bent pipe. The straight pipe is fixedly connected to the bottom of the flume, and a rotating blade 4-1 is arranged at the joint of the straight pipe and bent pipe to stop water flowing from the flume body 1-7. A detachable circular sealing plate 4-2 is fixed to the tail of the bent pipe by means of a screw, to facilitate sediment collection. The only difference between the bedload collector 4 and suspended load collector 5 is that the straight pipes have different dimensions along the length direction of the flume body. A dimension L of the bedload collector 4 along the length direction of the flume body is slightly greater than the maximum length $L_b$ of bedload jump:

$$L_b = \alpha D_{max} \left(\frac{\rho_s - \rho}{\rho}\right)^{1/3} \tau_*^{0.11}\left(\sqrt{\tau_*} - \beta\sqrt{\tau_{*c}}\right) \quad (1)$$

$$\beta = \frac{(D_m/D_{max})^{1/4}}{1 + 0.13 \ \ln(D_m/D_{max})} - 0.65 \quad (2)$$

where $D_{max}$ is the maximum incipient particle size of experimental sediment; $p_s$ is the sediment density, and $\rho$ is the water density;

$$\tau_* = \frac{\rho}{\rho_s - \rho} \frac{R_b J}{D_{min}}$$

is the dimensionless flow shear stress, $D_{min}$ is the minimum incipient particle size of the experimental sediment, $R_b$ is the hydraulic radius, and J is the hydraulic energy slope; $T_{*c}$ is the dimensionless incipient shear stress, with a value between 0.032-0.047; $D_m$ is the average particle size; the coefficient $\alpha$ is determined according to jumping experiments, and $\alpha \geq 150$.

A dimension $L_{sus}$ of the suspended load collector 5 along the length direction of the flume body is as follows:

$$L_{sus} > L_s = 1.2\frac{V_0 h_0^2}{h\omega_{min}} \quad (3)$$

where $L_s$ is the maximum moving distance of suspended load in the suspended load collector 5, $V_0$ is the flow velocity, $h_0$ is the water depth, h is the water depth in the suspended load collector, and $\omega_{min}$ is the settling velocity corresponding to minimum experimental particles $D_{min}$.

The bottom bed-simulated plate 3 is located at the bottom of the flume body 1-7 between the sediment feeder 2 and the bedload collector 4, and the bottom bed-simulated plate 3 has the same width as the flume body 1-7. During the experiment, particles with the same gradation as the experimental sand are stuck on an upper surface of the bottom bed-simulated plate to simulate a nonuniform rough bottom bed when sediment moves.

Before the experiment starts, tap water meeting a usage amount requirement is pre-added to the water storage tank 1-1, and the submersible pump 1-2 is placed in the water storage tank 1-1. When the front door 1-6 and tail door 1-8 are both drawn out, after the switch is turned on, the water enters the flume body 1-7 at the water inlet 1-4 through a pipeline by means of the submersible pump 1-2, then flows through the two flow-stabilizing plates 1-5 to smoothly overflow to an upper portion of the flume body 1-7, and finally flows back to the water storage tank 1-1 through the return pipe 1-9. The transfer of water from the water storage tank 1-1 to the flume body 1-7 is implemented by pumping the water by the submersible pump 1-2, and the process of water flowing back from the flume body 1-7 to the lower water storage tank 1-1 is completed under the action of gravity, thereby implementing circulation of water.

The experimental device for measuring the motion probability of nonuniform sediment according to the present disclosure further includes a current meter, a depth sounder, a slope adjusting device, and the like. The current meter is configured to measure a water velocity in the flume body, the depth sounder is configured to measure a water depth in the flume body, and the slope adjusting device is configured to adjust a slope of the bottom of the flume body 1-7.

Figure 5:
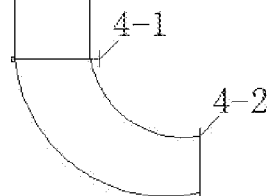
FIG. 5 is a schematic diagram of a collector.
Figure 6:
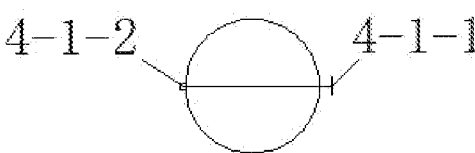
FIG. 6 is a top view of a rotating blade.

As shown in FIGS. 5 and 6, a rotating switch 4-1-1 is arranged on the rotating blade 4-1 on the bedload collector 4, and the rotating switch 4-1-1 extends out of the flume body 1-7. During use, the rotating blade 4-1 can be driven to turn over by rotating the rotating switch 4-1-1.

The experimental method for measuring the motion probability of nonuniform sediment according to the present disclosure includes the following steps.

Step 1: Sieve natural sand to obtain particles with different sizes $D_k$, dye and dry the particles in colors of red, yellow, green, blue, purple, black and white to obtain the dyed sediments, then weigh them to obtain a total weight $G_0$ of nonuniform sediment and a fractional weight G ok in each particle size, and calculate the initial gradation $p_{0k}=G_{0k}/\Sigma_k G_{0k}$; mix and soak the dyed sediment, and then place them into the sediment feeder 2 as experimental sediments.

Step 2: Stick the nonuniform sediment with the same initial grades as the experimental sediments on a bottom bed-simulated plate 3 to form a rough bed.

Step 3: Determine experimental water depths, set multiple flow velocities at each water depth to perform experiment, and performing steps 4 to 6 detailed below, where for each group of tests, the fractional incipient probability, the fractional suspension probability and corresponding probability distributions of the nonuniform sediment under a given water flow condition may be obtained.

It should be ensured that the minimum experimental flow velocity is greater than or equal to the calculated incipient velocity, and the maximum experimental flow velocity is greater than or equal to the calculated suspension velocity. The following formulas are used to calculate the incipient velocity $V_{kc}$ and suspension velocity $U_{*s}$ for the $k^{th}$ particle size, respectively:

$$V_{kc} = 8/7(h/D_m)^{1/6}[(\rho_s/\rho - 1)gD_k/\varepsilon_k]^{0.5} \tag{4}$$

$$U_{*s} = \begin{cases} \dfrac{4\omega}{D_*} & 1 < D_* \le 10 \\ 0.4\omega & D_* > 10 \end{cases} \tag{5}$$

$$D_* = D_k\left(\frac{\rho_s - \rho}{\rho}\frac{g}{v^2}\right)^{1/3} \tag{6}$$

where $D_k$ is the $k^{th}$ particle size, g is a gravity acceleration, $\rho_s$ and $\rho$ are densities of sediment and water, respectively, $$\varepsilon_k = (D_k/D_m)^{1/2}\sigma_g^{1/4}$$

is the interaction coefficient between different particles of nonuniform sediment, $D_m$ is the average particle size of sediment, $\sigma_g$ is the geometric standard deviation, and h is the water depth; $D_*$ is the dimensionless particle size, and $\omega$ is the settling velocity.

Step 4: Close the front door 1-6 and tail door 1-8 of the flume body 1-7, fill with water in the front of the tail door 1-8, start the submersible pump 1-2, open the front door 1-6 when the inlet water level is approximately flush with the water level in the flume, and slowly open the tail door 1-8; enlarge the tail door 1-8 while increasing the flow to a set value, so that the water level slowly drops until the water depth reaches a preset value; and adjust to a given flow velocity to start the experiment.

Step 5: Keep the experimental flow velocity and water depth unchanged, start the sediment feeder 2, and start an experiment of the dyed sediment transport in the flume body 1-7; keep moving for a sufficiently long time so that the dyed sediment in the sediment feeder 2 cease to move, and the dyed sediment on the rough plate is washed out, and close the tail door 1-8 and the submersible pump 1-2 to stop the experiment.

Step 6: Collect, in a case of partial transport, the dyed sediment in the sediment feeder 2, the bedload collector 4 and suspended load collector 5, dry in a 105° drying oven, sieve with the same standard sieve used in step 1, weigh by an electronic balance with accuracy of one thousandth of a gram to obtain weights $G_{bk}$ and $G_{sk}$ of the dyed sediment with different particle sizes in bedload and suspended load, and calculate the fractional incipient probability $p_{bk}=G_{bk}/G_0$ and the fractional suspension probability $p_{sk}=G_{sk}/G_0$ of the nonuniform sediment, so as to obtain a cumulative frequency of the bedload, namely an incipient probability distribution $$P_{bk} = \sum_{i=1}^{k} p_{bi},$$

and a cumulative frequency of suspended load, namely the suspension probability distribution $$P_{sk} = \sum_{i=1}^{k} p_{si}.$$

Collect, in a case of full transport, the dyed sediment in the bedload collector 4 and the suspended load collector 5 respectively, calculate the incipient probability and suspension probability in the same way as in the case of partial transport, and obtain respective probability distributions.

A person of ordinary skill in the art may understand that the above descriptions are only preferred examples of the present disclosure and are not intended to limit the present disclosure. Although the present disclosure is described in detail with reference to the foregoing examples, a person skilled in the art can still make modifications to the technical solutions described in the foregoing examples, or make equivalent replacements to some technical characteristics. Any modifications, equivalent replacements and the like made within the spirit and principle of the present disclosure should fall within the protection scope of the present disclosure.

What is claimed is:

1. An experimental device for measuring a motion probability of nonuniform sediment, comprising a flume, a sediment feeder, a bottom bed-simulated plate, a bedload collector, and a suspended load collector, wherein the flume comprises a water storage tank, a submersible pump, a flow-stabilizing plate, a front door, a flume body, a tail door and a water return pipe; the flume body is located above the water storage tank, and a tail of flume body is connected to the water storage tank through the return pipe; the submersible pump is located in the water storage tank, a water outlet of the submersible pump is connected to a water inlet of flume body through a pipeline so as to pump water into the flume body; the flow-stabilizing plate is installed near the water inlet of the flume body in order to enable the water to flow stably into the flume body; the front door and the tail door are located at both ends of the flume body respectively, which are able to be drawn up and down so as to block the water or adjust discharge in the flume body;

wherein the sediment feeder, located at a bottom of the flume body, is configured to contain sediments; the sediment feeder has a cover plate which is capable of bouncing off automatically; and wherein the bottom bed-simulated plate, the bedload collector, and the suspended load collector are sequentially arranged at the bottom of the flume body along a flow direction of the water; wherein the bottom bed-simulated plate is located between the sediment feeder and the bedload collector; wherein the bottom of the flume body has two holes, each of the bedload collector and the suspended load collector comprises a straight pipe and a bent pipe, and is fixed to one of the holes, at a corresponding position, at the bottom of the flume body through the straight pipe, and the bedload collector and the suspended load collector are configured to collect a bedload and a suspended load respectively.

2. The experimental device for measuring the motion probability of nonuniform sediment according to claim 1, wherein the sediment feeder is a drawer-type box with a rectangular cross-section and a trapezoidal profile, and comprises a movable cover plate; and each of two side surfaces of the cover plate is connected to a bayonet control switch via a spring.

3. The experimental device for measuring the motion probability of nonuniform sediment according to claim 1, wherein a width of the bedload collector is equal to a width of the flume body, and a rotating blade is arranged at a joint of the straight pipe and bent pipe of the bedload collector to stop the water flowing from the flume body; and a detachable circular sealing plate is fixed to a tail of the bent pipe so as to facilitate sediment collection.

4. The experimental device for measuring the motion probability of nonuniform sediment according to claim 3, wherein the suspended load collector and the bedload collector have a same structure, and a size of the suspended load collector is greater than that of the bedload collector along the flow direction of the water.

5. The experimental device for measuring the motion probability of nonuniform sediment according to claim 1, wherein the flow-stabilizing plate comprises two flow-stabilizing plates, which are set apart in parallel near the water inlet of the flume body.

6. The experimental device for measuring the motion probability of nonuniform sediment according to claim 1, wherein the flow-stabilizing plate is made of organic glass with uniform holes.

7. The experimental device for measuring the motion probability of nonuniform sediment according to claim 1, wherein a size $L_{push}$ of the bedload collector along the flow direction of the water is slightly greater than a maximum length $L_b$ of bedload jump:

$$L_{push} > L_b = \alpha D_{max} \left(\frac{\rho_s - \rho}{\rho}\right)^{1/3} \tau_*^{0.11} \left(\sqrt{\tau_*} - \beta\sqrt{\tau_{*c}}\right);$$

and $$\beta = \frac{(D_m/D_{max})^{1/4}}{1 + 0.13 \ln(D_m/D_{max})} - 0.65,$$

wherein $D_{max}$ is a maximum incipient particle size of experimental sediment; $\rho_s$ is a sediment density, and $\rho$ is a water density;

$$\tau_* = \frac{\rho}{\rho_s - \rho} \frac{R_b J}{D_{min}}$$

is a dimensionless flow shear stress, $D_{min}$ is a minimum incipient particle size of the experimental sediment, $R_b$ is a hydraulic radius, and J is a hydraulic energy slope; $\tau_{*c}$ is a dimensionless incipient shear stress, takes value between 0.032-0.047; $D_m$ is an average particle size; a coefficient $\alpha$ is determined according to jumping experiments, and $\alpha \geq 150$; and a size $L_{sus}$ of the suspended load collector in the flow direction of the water is as follows:

$$L_{sus} > L_s = 1.2\frac{V_0 h_0^2}{h\omega_{min}},$$

wherein $L_s$ is a maximum moving distance of the suspended load, $V_0$ is a flow velocity, $h_0$ is a water depth, h is a depth of the suspended load collector, and $\omega_{min}$

12 is a settling velocity corresponding to a minimum particle size $D_{min}$ in experiments.

8. An experimental method for measuring a motion probability of nonuniform sediment, wherein the method is implemented based on the experimental device for measuring the motion probability of nonuniform sediment according to claim 1, and the method comprises:

by a sieve, sieving natural sand to obtain particles of different sizes $D_k$, dyeing and drying the particles in colors of red, yellow, green, blue, purple, black and white to obtain dyed sediments, then weighing the dyed sediments to obtain a total weight $G_0$ of nonuniform sediment and a fractional weight $G_{0k}$ in each particle size, and calculating initial grades $p_{0k}=G_{0k}/\Sigma_k G_{0k}$; mixing and soaking the dyed sediment, and placing the dyed sediments into the sediment feeder as experimental sediments;

sticking nonuniform sediment with a same initial grade as the experimental sediments on the bottom bed-simulated plate to form a rough bed;

determining experimental water depths, setting a plurality of experimental flow velocities at each water depth to perform experiments, and for each group of experiments, obtaining fractional incipient probabilities, fractional suspension probabilities and corresponding probability distributions under a given flow condition;

ensuring that a minimum experimental flow velocity is greater than or equal to a calculated incipient velocity, and a maximum flow velocity is greater than or equal to a calculated suspension velocity; and calculating an incipient velocity $V_{kc}$ and a suspension velocity $U_{*s}$ for a $k^{th}$ particle size respectively through following formulas:

$$V_{kc} = 8/7(h/D_m)^{1/6}\left[(\rho_s/\rho - 1)gD_k/\varepsilon_k\right]^{0.5};$$

$$U_{*s} = \begin{cases} \dfrac{4\omega}{D_*} & 1 < D_* \leq 10 \\ 0.4\omega & D_* > 10 \end{cases}; \text{ and}$$

$$D_* = D_k\left(\frac{\rho_s - \rho}{\rho}\frac{g}{v^2}\right)^{1/3},$$

wherein $D_k$ is the $k^{th}$ particle size, g is a gravity acceleration, $\rho_s$ and $\rho$ are densities of sediment and water respectively, $$\varepsilon_k = (D_k/D_m)^{1/2}\sigma_g^{1/4}$$

is a interaction coefficient between different particles of nonuniform sediment, $D_m$ is an average particle size, $\sigma_g$ is a geometric standard deviation, and h is a water depth; $D_*$ is a dimensionless particle size, and $\omega$ is a settling velocity;

starting the submersible pump, adjusting the front door and the tail door of the flume body to enable the water depth to reach a preset experimental value, and setting an appropriate flow velocity with reference to formula-calculated values of the incipient velocity and the suspension velocity to start the experiment;

keeping the experimental flow velocity and the water depth unchanged, starting the sediment feeder, and starting an experiment transport of the dyed sediments in the flume body; keeping moving for a sufficiently long time so that the dyed sediments in the sediment feeder cease to move and the dyed sediments on the rough plate is washed out, and closing the tail door and the submersible pump to stop the experiment; and collecting, in a case of partial transport, the dyed sediment in the sediment feeder, the bedload collector and the suspended load collector respectively, drying and then sieving the dyed sediments via the sieve, weighing the dyed sediments with different particle sizes in the bedload and the suspended load respectively to obtain weights $G_{bk}$ and $G_{sk}$, and calculating a fractional incipient probability $p_{bk}=G_{bk}/G_0$ and a fractional suspension probability $p_{sk}=G_{sk}/G_0$ of the nonuniform sediment, so as to obtain a cumulative frequency of the bedload, namely an incipient probability distribution $$P_{bk} = \sum_{i=1}^{k} p_{bi},$$

and a cumulative frequency of the suspended load, namely a suspension probability distribution $$P_{sk} = \sum_{i=1}^{k} p_{si};$$

or collecting, in a case of full transport, the dyed sediments in the bedload collector and the suspended load collector respectively, calculating an incipient probability and a suspension probability in a same way as in the case of partial transport, and obtaining respective probability distributions.

9. The experimental method for measuring a motion probability of nonuniform sediment according to claim 8, wherein the sediment feeder is a drawer-type box with a rectangular cross-section and a trapezoidal profile, and comprises a movable cover plate; and each of two side surfaces of the cover plate is connected to a bayonet control switch via a spring.

10. The method for measuring the motion probability of nonuniform sediment according to claim 8, wherein a width of the bedload collector is equal to a width of the flume body, and a rotating blade is arranged at a joint of the straight pipe and bent pipe of the bedload collector to stop the water flowing from the flume body; and a detachable circular sealing plate is fixed to a tail of the bent pipe so as to facilitate sediment collection.

11. The method for measuring the motion probability of nonuniform sediment according to claim 10, wherein the suspended load collector and the bedload collector have a same structure, and a size of the suspended load collector is greater than that of the bedload collector along the flow direction of the water.

12. The method for measuring the motion probability of nonuniform sediment according to claim 8, wherein the flow-stabilizing plate comprises two flow-stabilizing plates, which are set apart in parallel near the water inlet of the flume body.

13. The method for measuring the motion probability of nonuniform sediment according to claim 8, wherein the flow-stabilizing plate is made of organic glass with uniform holes.

14. The method for measuring the motion probability of nonuniform sediment according to claim 8, wherein a size $L_{push}$ of the bedload collector along the flow direction of the water is slightly greater than a maximum length $L_b$ of bedload jump:

$$L_{push} > L_b = \alpha D_{max} \left( \frac{\rho_s - \rho}{\rho} \right)^{1/3} \tau_*^{0.11} \left( \sqrt{\tau_*} - \beta \sqrt{\tau_{*c}} \right);$$

and $$\beta = \frac{(D_m/D_{max})^{1/4}}{1 + 0.13 \ln(D_m/D_{max})} - 0.65,$$

wherein $D_{max}$ is a maximum incipient particle size of experimental sediment; $\rho_s$ is a sediment density, and $\rho$ is a water density;

$$\tau_* = \frac{\rho}{\rho_s - \rho} \frac{R_b J}{D_{min}}$$

is a dimensionless flow shear stress, $D_{min}$ is a minimum incipient particle size of the experimental sediment, $R_b$ is a hydraulic radius, and J is a hydraulic energy slope; $\tau_{*c}$ is a dimensionless incipient shear stress, takes value between 0.032-0.047; $D_m$ is an average particle size; a coefficient $\alpha$ is determined according to jumping experiments, and $\alpha \geq 150$; and a size $L_{sus}$ of the suspended load collector in the flow direction of the water is as follows:

$$L_{sus} > L_s = 1.2 \frac{V_0 h_0^2}{h \omega_{min}},$$

wherein $L_s$ is a maximum moving distance of the suspended load, $V_0$ is a flow velocity, $h_0$ is a water depth, h is a depth of the suspended load collector, and $\omega_{min}$ is a settling velocity corresponding to a minimum particle size $D_{min}$ in experiments.

* * * * *